(12) United States Patent
Morrison et al.

(10) Patent No.: US 11,352,854 B2
(45) Date of Patent: Jun. 7, 2022

(54) INJECTIVITY AND PRODUCTION IMPROVEMENT IN OIL AND GAS FIELDS

(71) Applicant: Halliburton Energy Services, Inc., Houston, TX (US)

(72) Inventors: Alexandra Clare Morrison, The Woodlands, TX (US); Hui Zhou, The Woodlands, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 219 days.

(21) Appl. No.: 16/640,325

(22) PCT Filed: May 13, 2019

(86) PCT No.: PCT/US2019/032020
§ 371 (c)(1),
(2) Date: Feb. 19, 2020

(87) PCT Pub. No.: WO2020/231400
PCT Pub. Date: Nov. 19, 2020

(65) Prior Publication Data
US 2021/0396098 A1 Dec. 23, 2021

(51) Int. Cl.
*E21B 37/08* (2006.01)
*C09K 8/524* (2006.01)

(52) U.S. Cl.
CPC .............. *E21B 37/08* (2013.01); *C09K 8/524* (2013.01); *C09K 2208/24* (2013.01)

(58) Field of Classification Search
None
See application file for complete search history.

(56) References Cited

U.S. PATENT DOCUMENTS

| 5,881,813 A * | 3/1999 | Brannon ................ C09K 8/605 |
| | | 166/304 |
| 6,763,888 B1 | 7/2004 | Harris et al. |
| 2004/0014606 A1 | 1/2004 | Parlar et al. |
| 2006/0016596 A1 * | 1/2006 | Pauls .................... C09K 8/536 |
| | | 166/276 |

(Continued)

FOREIGN PATENT DOCUMENTS

| JP | 2008142080 A | 6/2008 |
| WO | 2004007905 A1 | 1/2004 |

(Continued)

OTHER PUBLICATIONS

International Search Report and Written Opinion dated Feb. 7, 2020, International PCT Application No. PCT/US2019/032020.

*Primary Examiner* — Andrew Sue-Ako
(74) *Attorney, Agent, or Firm* — McGuireWoods LLP

(57) ABSTRACT

Methods and systems for treating wellbores. An example method includes introducing an acidic treatment fluid into the well; wherein the acidic treatment fluid comprises an acid and a first aqueous base fluid. The method further includes introducing an enzymatic treatment fluid into the well; wherein the enzymatic treatment fluid comprises an enzyme and a second aqueous base fluid. The method additionally includes contacting the filter cake with the acidic treatment fluid and contacting the filter cake with the enzymatic treatment fluid after the filter cake was contacted with the acidic treatment fluid.

20 Claims, 3 Drawing Sheets

(56) References Cited

U.S. PATENT DOCUMENTS

| | | |
|---|---|---|
| 2006/0105917 A1 | 5/2006 | Munoz |
| 2008/0017382 A1* | 1/2008 | Harris .................... C09K 8/52 |
| | | 166/307 |
| 2011/0120713 A1* | 5/2011 | Todd .................... E21B 43/267 |
| | | 166/280.1 |
| 2012/0208726 A1 | 8/2012 | Smith et al. |
| 2016/0362597 A1 | 12/2016 | Harris |
| 2018/0244979 A1 | 8/2018 | Aldhufairi et al. |

FOREIGN PATENT DOCUMENTS

| | | |
|---|---|---|
| WO | 2009069060 A1 | 6/2009 |
| WO | 2018025011 A1 | 2/2018 |

* cited by examiner

INJECTIVITY AND PRODUCTION IMPROVEMENT IN OIL AND GAS FIELDS

TECHNICAL FIELD

The present disclosure relates generally to wellbore operations, and more particularly, to improving injectivity and production by treating the well with acidic and enzymatic treatment fluids to improve the removal of filter cake and formation damaging materials.

BACKGROUND

In some wellbores, injection operations may be used to improve production by injecting fluids into the formation under pressure through one or more injection wells penetrating the reservoir. The injection fluids may then drive the hydrocarbons towards one or more producing wells in the reservoir.

The efficiency of an injection operation may vary greatly depending on the permeability of the surrounding formation. In particular, the injection fluid may flow through the area of least resistance as it travels through the wellbore, bypassing the less permeable zones. If the injection fluid bypasses the less permeable zone, there will be less hydrocarbons driven from these zones to a corresponding production well. One factor that may affect formation permeability is the presence of a filter cake at the rock interface of the less permeable zones and the wellbore. A certain amount of filter cake may be desirable for preventing a loss in circulation of the drilling fluid during the drilling of the wellbore. Moreover, the filter cake may isolate the permeable formations from the drilling fluid thereby preventing potential formation damage. However, should the filter cake remain, it may reduce permeability into and out of the formation. The present disclosure provides improved methods and compositions for the removal of filter cake and other formation damaging materials from a wellbore and subterranean formation.

BRIEF DESCRIPTION OF THE DRAWINGS

Illustrative examples of the present disclosure are described in detail below with reference to the attached drawing figures, which are incorporated by reference herein, and wherein.

Figure 1:
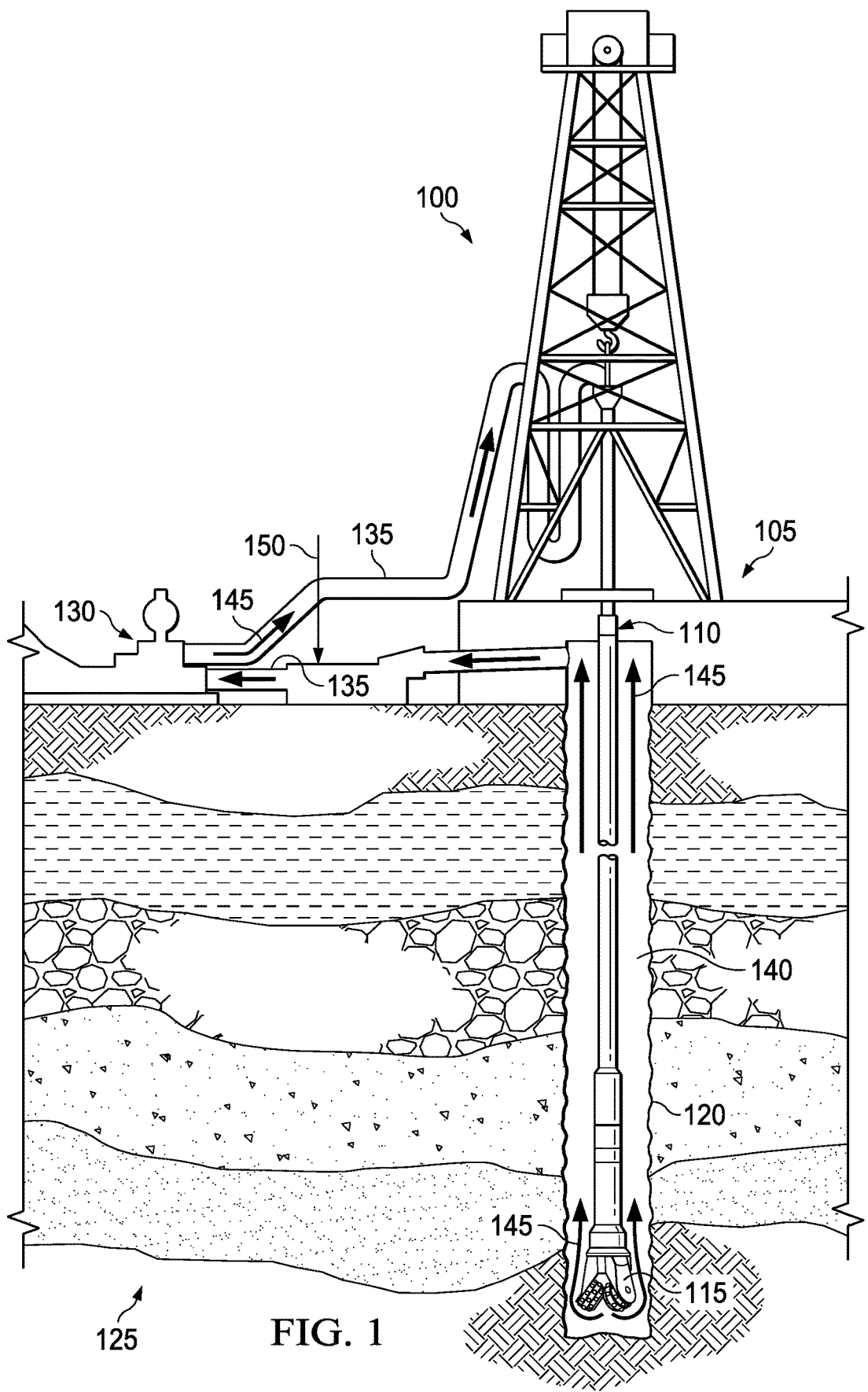
FIG. 1 is a schematic illustrating a system for the drilling of a wellbore in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to improving injectivity and production by treating the well with acidic and enzymatic treatment fluids to improve the removal of filter cake and formation damaging materials.

In the following detailed description of several illustrative examples, reference is made to the accompanying drawings that form a part hereof, and in which is shown by way of illustration examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of methods for the removal of filter cake and formation damaging materials. The methods may be used to remove filter cake and formation damaging materials from the rock interface of a subterranean formation within a wellbore penetrating the subterranean formation. The subterranean formation may be a subterranean formation subject to or intended to be subject to a wellbore operation such as an injection operation or enhancing recovery of hydrocarbons during production. The wellbore may be a wellbore of an injection well used to drive hydrocarbons into a production well also penetrating the subterranean formation. In an injection operation, there may be no flow back of the treatment fluids after treatment. The wellbore may be a wellbore of a producing well that may benefit from treatment to remove filter cake and other formation damaging materials. In an enhanced recovery operation, a subsequent flow back of the treatment fluids may be performed after treatment. Advantageously, the methods utilize distinct acid and enzymatic treatment fluids to remove water-soluble, acid-soluble, and enzymatic substrates from the wellbore. A further advantage of the methods is that the sequence of treatment fluid introduction increases the wellbore interval treated with the acid. An additional advantage is that the treatment fluids do not require flow back before commencement of an injection operation, which may reduce operation cost and non-productive time. Another advantage is that the enzymatic treatment fluid may remove filter cake components and potentially formation damaging materials (e.g., viscosifying starches) that can be difficult to remove with other treatments.

Drilling fluids may deposit filter cake on the walls of the wellbore within a producing formation. The filter cake may prevent the drilling fluid from being lost to the formation as well as prevent the drilling fluid solids and/or drill cuttings from entering the formation. The methods described herein generally comprise the use of a drilling fluid comprising drilling fluid additives that are water-soluble, water-dispersible, acid-soluble, and/or degradable with an enzyme. Examples of drilling fluid additives may include, but are not limited to, bridging agents, weighting agents, viscosifiers, pH buffers, defoaming agents, shale stabilizers, fluid loss control additives, lost circulation materials, corrosion inhibitors, and any combination thereof. The disclosed methods may remove any drilling fluid additives that are water-soluble, acid soluble, and/or degradable with an enzyme from the rock interface of the subterranean formation and the wellbore. The removal of these materials may increase permeability into and out of the subterranean formation, thereby improving injectivity of an injection well and production in a producing well.

A bridging agent may be used to bridge the formation interface of the exposed formation rock so as to prevent the loss of the drilling fluid into the formation. In particular, bridging agents that are acid-soluble may be used. Examples of acid-soluble bridging agents include, but are not limited to, calcium carbonate, magnesium carbonate, magnesium oxide, magnesium citrate, bismuth citrate, zinc carbonate, zinc oxide, zinc carbonate, calcium sulfate, calcium citrate, calcium succinate, calcium tartrate, bismuth citrate, iron carbonate, polylactide, polyesters, polyorthoesters, and any combinations thereof.

A weighting agent may be used to impart density to the drilling fluid. Increasing the density of the drilling fluid may be important to assist the drilling fluid in controlling formation pressures, preventing formation caving, facilitating pipe pulling, and the like. In particular, weighting agents that are acid-soluble may be used. Examples of acid-soluble weighting agents may include, but are not limited to, hematite, calcium carbonate, manganese tetraoxide, ilmenite, iron oxide, dolomite, and any combination thereof.

A viscosifier may affect the rheology of the drilling fluid such as by influencing the viscosity. The viscosifier may also act as suspending agent and assist in the suspension of drill cuttings and wellbore solids. In particular, viscosifiers that are enzymatic substrates may be used. Enzymatic-substrate viscosifiers are generally polysaccharides. Examples include, but are not limited to, xanthan gum, welan gum, gellan gum, guar gum, succinoglycon gum, diutan gum, cornstarch, arrowroot, potato starch, scleroglucan, hydroethylcellulose ("HEC"), and any combination thereof. Derivatives of the polysaccharides may also be used, for example, starch ether derivatives and crosslinked polysaccharides.

A pH buffer may be used to control the pH of the drilling fluid, which may in some instances affect the operability of certain other additives. In particular, pH buffers that are water-soluble may be used. Examples of the pH buffer may include, but are not limited to, oxides (e.g., magnesium oxide, calcium oxide, and the like), hydroxides (e.g., sodium hydroxide, magnesium hydroxide, calcium hydroxide, potassium hydroxide, lithium hydroxide, and the like), carbonates (e.g., sodium carbonate, potassium carbonate, sodium bicarbonate, sodium sesquicarbonate, and the like), phosphates (sodium phosphate, potassium phosphate, sodium hydrogen phosphate, potassium hydrogen phosphate, sodium dihydrogen phosphate, potassium dihydrogen phosphate, and the like), diacetates (e.g., sodium diacetate, potassium diacetate, ammonium diacetate, and the like), sodium borate, fumaric acid, formic acid, hydroxyfluoboric acid, polyaspartic acid, acetic acid, acetic anhydride, polysuccinimide, sulfamic acid, and any combination thereof.

A defoaming agent may be included in the drilling fluids. The defoaming agent may be used to reduce the foam of the drilling fluid. In particular, defoaming agents that are water-soluble, water-dispersible, and/or acid-soluble may be used. Examples of suitable defoaming agents may include, but are not limited to, straight-chain n-alcohols, polyether polyols, particulate graphite, particulate aluminum stearate, particulate hydrophobically-modified clays, alkylene glycol, polyalkylene glycol, silicone oil emulsions, silicone-glycol compounds, silicone-silica adducts, silicone-silica adduct emulsions, calcium stearate, zinc stearate, and any combination thereof.

A shale stabilizer may be included in the drilling fluids. The shale stabilizer may be used to inhibit shale and clay from reaction with the water phase of the drilling fluid. The shale stabilizer may reduce sticking, swelling, and sloughing of shale and clay. In particular, shale stabilizers that are water-soluble and/or acid-soluble may be used. Examples of shale stabilizers may include, but are not limited to, salts of alkali metals (e.g., potassium salts, sodium salts, calcium salts and the like), alkali metal acetates, ammonium chloride, tetramethyl ammonium chloride, amines, polyamines, ethoxylated polyamines, polyether amines, polyalkylene glycols, polyacrylamide, partially-hydrolyzed polyacrylamides, polyvinyl alcohol, polyvinylpyrrolidone, and any combination thereof.

Some components of the filter cake as well as other potentially damaging formation materials may remain in the wellbore after the conclusions of drilling and completion. Removal of these materials from the wellbore and the formation may increase the efficacy of subsequent injection treatments or may improve hydrocarbon production. The methods described herein generally comprise the use of an acidic treatment fluid. The acidic treatment fluid may comprise any type of acid for wellbore cleanup, (e.g., live acids, strong acids, weak acids, or acids produced from acid generators in situ). The acidic treatment fluid may degrade any acid-soluble material remaining in the wellbore after drilling and completion.

The acidic treatment fluid comprises an aqueous base fluid and an acid. "Acid" as used herein refers to any acid including those produced from any acid generator. The acid may be a live acid, a strong acid, a weak acid, or an acid produced from an acid generator. Acid generators include delayed or triggered acid generators. Examples of the acid may include, but are not limited to, hydrochloric acid, hydrofluoric acid, sulfuric acid, phosphoric acid, formic acid, acetic acid, citric acid, adipic acid, succinic acid, glutaric acid, lactic acid, sulfamic acid, ethylene diamine tetra acetic acid, and any combination thereof. Examples of acid generators include, but are not limited to, ethyl lactate, methyl lactate, glucono-delta-lactone, polylactic acid, polyglycolic acid, poly(3-hydroxybutyrate), polysuccinate ester, polyanhydride, maleic anhydride, orthoester, formate ester-diethylene glycol diformate, acetate ester, L-dilactide, lactate ester, butyl lactate, poly(lactic-co-glycolic acid), poly(glycolic-co-caprolactone), polycaprolactone, poly(glycolic-co-trimethylene carbonate), poly(lactic-co-caprolactone), poly(lactic-co-trimethylene carbonate), polyglyconate, polyglactin, poly(lactic-co-glycolic acid)-methoxy-poly(ethyleneglycol) copolymer, polydioxanone, derivatives thereof, and any combination thereof.

The aqueous base fluid for the acidic treatment fluid may be any aqueous fluid including, but not limited to, freshwater, saltwater (e.g., water containing one or more salts dissolved therein), brine (e.g., saturated saltwater, which may be produced from subterranean formations), seawater, or any combination thereof. Generally, the aqueous fluid may be from any source provided that the aqueous fluid does not contain an excess of compounds that may undesirably affect other components in the acidic treatment fluid. In the case of salt waters and brines, the aqueous fluid may comprise a monovalent salt or a divalent salt. Suitable monovalent salts may include, for example, sodium chloride salt, sodium bromide salt, potassium chloride salt, potassium bromide salt, and the like. Suitable divalent salt can include, for example, magnesium chloride salt, calcium chloride salt, calcium bromide salt, and the like. One of ordinary skill in the art, with the benefit of this disclosure, should be readily able to select an aqueous fluid for a chosen application.

The concentration of the acid in the acidic treatment fluid may range from about 0.1% (w/w) to about 40% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the acid in the acidic treatment fluid may range from about 0.1% (w/w) to about 40% (w/w), from about 0.5% (w/w) to about 40% (w/w), from about 1% (w/w) to about 40% (w/w), from about 2% (w/w) to about 40% (w/w), from about 3% (w/w) to about 40% (w/w), from about 4% (w/w) to about 40% (w/w), from about 5% (w/w) to about 40% (w/w), from about 6% (w/w) to about 40% (w/w), from about 7% (w/w) to about 40% (w/w), from about 8% (w/w) to about 40% (w/w), from about 9% (w/w) to about 40% (w/w), from about 10% (w/w) to about 40% (w/w), from about 11% (w/w) to about 40% (w/w), from about 12% (w/w) to about 40% (w/w), from about 13% (w/w) to about 40% (w/w), from about 14% (w/w) to about 40% (w/w), from about 15% (w/w) to about 40% (w/w), from about 16% (w/w) to about 40% (w/w), from about 17% (w/w) to about 40% (w/w), from about 18% (w/w) to about 40% (w/w), from about 19% (w/w) to about 40% (w/w), from about 20% (w/w) to about 40% (w/w), from about 21% (w/w) to about 40% (w/w), from about 22% (w/w) to about 40% (w/w), from about 23% (w/w) to about 40% (w/w), from about 24% (w/w) to about 40% (w/w), from about 25% (w/w) to about 40% (w/w), from about 26% (w/w) to about 40% (w/w), from about 27% (w/w) to about 40% (w/w), from about 28% (w/w) to about 40% (w/w), from about 29% (w/w) to about 40% (w/w), from about 30% (w/w) to about 40% (w/w), from about 31% (w/w) to about 40% (w/w), from about 32% (w/w) to about 40% (w/w), from about 33% (w/w) to about 40% (w/w), from about 34% (w/w) to about 40% (w/w), from about 35% (w/w) to about 40% (w/w), from about 36% (w/w) to about 40% (w/w), from about 37% (w/w) to about 40% (w/w), from about 38% (w/w) to about 40% (w/w), or from about 39% (w/w) to about 40% (w/w). As another example, the concentration of the acid in the acidic treatment fluid may range from about 0.1% (w/w) to about 40% (w/w), from about 0.1% (w/w) to about 39% (w/w), from about 0.1% (w/w) to about 38% (w/w), from about 0.1% (w/w) to about 37% (w/w), from about 0.1% (w/w) to about 36% (w/w), from about 0.1% (w/w) to about 35% (w/w), from about 0.1% (w/w) to about 34% (w/w), from about 0.1% (w/w) to about 33% (w/w), from about 0.1% (w/w) to about 32% (w/w), from about 0.1% (w/w) to about 31% (w/w), from about 0.1% (w/w) to about 30% (w/w), from about 0.1% (w/w) to about 29% (w/w), from about 0.1% (w/w) to about 28% (w/w), from about 0.1% (w/w) to about 27% (w/w), from about 0.1% (w/w) to about 26% (w/w), from about 0.1% (w/w) to about 25% (w/w), from about 0.1% (w/w) to about 24% (w/w), from about 0.1% (w/w) to about 23% (w/w), from about 0.1% (w/w) to about 22% (w/w), from about 0.1% (w/w) to about 21% (w/w), from about 0.1% (w/w) to about 20% (w/w), from about 0.1% (w/w) to about 19% (w/w), from about 0.1% (w/w) to about 18% (w/w), from about 0.1% (w/w) to about 17% (w/w), from about 0.1% (w/w) to about 16% (w/w), from about 0.1% (w/w) to about 15% (w/w), from about 0.1% (w/w) to about 14% (w/w), from about 0.1% (w/w) to about 13% (w/w), from about 0.1% (w/w) to about 12% (w/w), from about 0.1% (w/w) to about 11% (w/w), from about 0.1% (w/w) to about 10% (w/w), from about 0.1% (w/w) to about 9% (w/w), from about 0.1% (w/w) to about 8% (w/w), from about 0.1% (w/w) to about 7% (w/w), from about 0.1% (w/w) to about 6% (w/w), from about 0.1% (w/w) to about 5% (w/w), from about 0.1% (w/w) to about 4% (w/w), from about 0.1% (w/w) to about 3% (w/w), from about 0.1% (w/w) to about 2% (w/w), from about 0.1% (w/w) to about 1% (w/w), or from about 0.1% (w/w) to about 0.5% (w/w). With the benefit of this disclosure, one of ordinary skill in the art will be readily able to prepare an acidic treatment fluid having a sufficient concentration of acid for a given application.

The methods described herein generally comprise the use of an enzymatic treatment fluid. The enzymatic treatment fluid comprises an aqueous base fluid and an enzyme. The enzymatic treatment fluid may comprise any type of enzyme suitable for the removal of the targeted enzymatic-substrates. Examples of the enzyme include, but are not limited to, an amylase, a cellulase, a xanthanase, derivatives thereof, and any combinations thereof. In a specific example, the enzyme is an amylase used to hydrolyze polysaccharides (e.g., some viscosifying starches used in the drilling fluid) into simple sugars that may be further degraded or dissolved in the aqueous base fluid of the treatment fluids. In one specific example, the enzyme is an α-amylase that may hydrolyze xanthan gum. In another specific example, the enzyme is a cellulase that may hydrolyze cellulose or HEC. In an additional specific example, the enzyme is a xanthanase that may hydrolyze xanthan gum. The polysaccharide may be introduced into the wellbore as a viscosifier for the drilling fluid. After drilling and completion, a portion of the polysaccharide may be left behind in the filter cake. The enzyme of the enzymatic treatment fluid generally reacts with and degrades its specific targeted substrates much faster than the acid of the acidic treatment fluid. As such, the enzymatic treatment fluid is introduced after the acidic treatment fluid so that the acidic treatment fluid may treat a long wellbore interval without increased risk of losing the acidic treatment fluid into a higher permeability zone formed from the fast-acting treatment of the enzymatic treatment fluid. Moreover, contact of the enzyme with an acid, may deactivate the enzyme and denature it.

The enzymatic treatment fluid comprises an aqueous base fluid and an enzyme. "Enzyme" as use herein refers to any enzyme capable of breaking down, through hydrolysis or other chemical reaction, a polysaccharide used in the drilling fluid. In particular, the enzyme may be used to breakdown viscosifying starches, celluloses, hydroxyethyl cellulose, xanthan, guar, gums, and other similar biopolymers. Examples of the enzyme include, but are not limited to, any amylase such as α-amylases, β-amylases, γ-amylases, or derivative thereof any cellulase or derivative thereof, any xanthanase or derivative thereof and any combinations thereof.

The aqueous base fluid for the enzymatic treatment fluid may be any aqueous fluid including, but not limited to, freshwater, saltwater (e.g., water containing one or more salts dissolved therein), brine (e.g., saturated saltwater, which may be produced from subterranean formations), seawater, or any combination thereof. Generally, the aqueous fluid may be from any source provided that the aqueous fluid does not contain an excess of compounds that may undesirably affect other components in the enzymatic treatment fluid. In the case of salt waters and brines, the aqueous fluid may comprise a monovalent salt or a divalent salt. Suitable monovalent salts may include, for example, sodium chloride salt, sodium bromide salt, potassium chloride salt, potassium bromide salt, and the like. Suitable divalent salt can include, for example, magnesium chloride salt, calcium chloride salt, calcium bromide salt, and the like. One of ordinary skill in the art, with the benefit of this disclosure, should be readily able to select an aqueous fluid for a chosen application.

The concentration of the enzyme in the enzymatic treatment fluid may range from about 0.001% (w/w) to about 10% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the enzyme in the enzymatic treatment fluid may range from about 0.001% (w/w) to about 10% (w/w), from about 0.005% (w/w) to about 10% (w/w), from about 0.01% (w/w) to about 10% (w/w), from about 0.05% (w/w) to about 10% (w/w), from about 0.1% (w/w) to about 10% (w/w), from about 0.5% (w/w) to about 10% (w/w), from about 1% (w/w) to about 10% (w/w), from about 2% (w/w) to about 10% (w/w), from about 3% (w/w) to about 10% (w/w), from about 4% (w/w) to about 10% (w/w), from about 5% (w/w) to about 10% (w/w), from about 6% (w/w) to about 10% (w/w), from about 7% (w/w) to about 10% (w/w), from about 8% (w/w) to about 10% (w/w), or from about 9% (w/w) to about 10% (w/w). As another example, the concentration of the enzyme in the enzymatic treatment fluid may range from about 0.001% (w/w) to about 10% (w/w), from about 0.001% (w/w) to about 9% (w/w), from about 0.001% (w/w) to about 8% (w/w), from about 0.001% (w/w) to about 7% (w/w), from about 0.001% (w/w) to about 6% (w/w), from about 0.001% (w/w) to about 5% (w/w), from about 0.001% (w/w) to about 4% (w/w), from about 0.001% (w/w) to about 3% (w/w), from about 0.001% (w/w) to about 2% (w/w), from about 0.001% (w/w) to about 1% (w/w), from about 0.001% (w/w) to about 0.5% (w/w), from about 0.001% (w/w) to about 0.1% (w/w), from about 0.001% (w/w) to about 0.05% (w/w), from about 0.001% (w/w) to about 0.01% (w/w), or from about 0.001% (w/w) to about 0.005% (w/w). With the benefit of this disclosure, one of ordinary skill in the art will be readily able to prepare an enzymatic treatment fluid having a sufficient concentration of the enzyme for a given application.

As will be appreciated by those of ordinary skill in the art, the disclosed methods of wellbore cleanup may be used in a variety of subterranean operations, including general wellbore cleanup, injection operations, and enhanced recovery operations for older wells. As an example, after drilling and completion, the acidic treatment fluid may be introduced into an injection well where it may treat the acid degradable materials in the injection well. As a further example, the acid in the acidic treatment fluid may dissolve calcium carbonate and other acid-soluble materials, removing these materials from the wellbore walls and rock interface. Acidic treatment fluids comprising slower-reacting acids or delayed/triggered acid generators may treat longer wellbore intervals as there may be less leak-off initially from the acid's delayed or slower reaction. After treatment with the acidic treatment fluid, the enzymatic treatment fluid may be introduced into the wellbore. The enzyme in the enzymatic treatment fluid may react very quickly with any enzymatic-substrate. Degrading these targeted enzymatic-substrates may improve injectivity as the enzymatic treatment fluid is pumped. The enzyme may target polysaccharide materials remaining in the filter cake and pore throats of the rock interface that are acid- and water-insoluble or have very low acid- and water-solubility. One or both of the acidic treatment fluid and the enzymatic treatment fluid may be provided as pills (e.g., fluid volumes of less than 200 barrels) and may not be continuously pumped if desired. Alternatively, one or both of the acidic treatment fluid and the enzymatic treatment fluid may be continuously pumped if desired. For example, the acidic treatment fluid may be provided as a pill and then the enzymatic treatment fluid may be the injection stream of an injection operation and may be continuously pumped into the wellbore. As another example, the acidic treatment fluid may be continuously pumped for as long as desired, and then followed by a pill of the enzymatic treatment fluid. In some optional examples, a spacer fluid may be injected in-between the acidic treatment fluid and the enzymatic treatment fluid series. For wellbore injectivity operations, additional flow back of the treatment fluid is not needed, and an injection fluid may be pumped into the injection well after treatment with the acidic treatment fluid and the enzymatic treatment fluid. If the drilling fluid used to drill the injection well contained mostly, if not solely, products that are water-soluble, acid-soluble, and/or enzyme-degradable then the majority, if not all, of the residual filter cake components left behind may be removed by the disclosed treatment methods.

In an enhanced recovery operation, the acidic treatment fluid and the enzymatic treatment fluid may be used to improve hydrocarbon flow through the rock interface at any time after completion. A similar process may be done as performed in the above description of an injection operation; however, the acidic treatment fluid and the enzymatic treatment fluid may be flowed back out of the well after treatment. The well may then be put on production or placed back on production if the enhanced recovery operation was performed as a remediation operation for an already producing well.

As discussed above, treatment with the enzymatic treatment fluid follows treatment with the acidic treatment fluid. This sequence is preferred as it reduces the possibility of the generally slower-acting acidic treatment fluid from being lost to a highly permeable zone of the formation opened up from treatment with the faster acting enzymatic treatment fluid if the enzymatic treatment fluid was introduced first. Moreover, the acid can denature the enzyme, inducing it to precipitate and deactivating it. The denatured enzyme may also cause formation damage. As such, if the acidic treatment fluid is used after the enzymatic treatment fluid, it may contact and denature the enzyme remaining in the wellbore and/or formation where it could potentially denature the enzyme and induce formation damage. Similarly, the acid and the enzyme are not combined in the same treatment fluid for these reasons.

Optionally, additional fluids may be introduced prior to the introduction of the acidic treatment fluid and/or the enzymatic treatment fluid. As an example, a spacer fluid may be introduced after the acidic treatment fluid, but before the enzymatic treatment fluid. The spacer fluid may be beneficial in reducing the potential for any remaining acid in the wellbore from contacting the enzyme in the enzymatic treatment fluid. The spacer fluid may be an aqueous- or oleaginous-based fluid. In some examples, treatment with the acidic treatment fluid and/or the enzymatic treatment fluid may be repeated. In one specific example, two pills of the acidic treatment fluid may be introduced before the enzymatic treatment fluid is introduced.

Example systems may comprise a pump fluidly coupled to a tubular, the tubular containing the drilling fluid or one of the treatment fluids as described herein. The pump may be a high-pressure pump or a low-pressure pump. As used herein, the term "high-pressure pump" will refer to a pump that is capable of delivering a fluid downhole at a pressure of about 1000 psi or greater. Suitable high-pressure pumps will be known to one having ordinary skill in the art and may include, but are not limited to, floating piston pumps and positive displacement pumps. In other examples, the pump may be a low-pressure pump. As used herein, the term "low-pressure pump" will refer to a pump that operates at a pressure of about 1000 psi or less. Suitable low-pressure pumps will be known to one having ordinary skill in the art.

In some examples, the systems described herein may further comprise a mixing tank that is upstream of the pump and is the vessel in which the drilling fluid or the treatment fluids may be individually formulated. In various examples, the pump (e.g., a low-pressure pump, a high-pressure pump, or a combination thereof) may convey the drilling fluid and/or the treatment fluids from the mixing tank to the transporting conduit. In other examples, the drilling fluid and/or the treatment fluids may be formulated offsite and transported to a worksite, where they may be introduced to the transporting conduit either directly from a shipping container (e.g., a truck, a railcar, a barge, or the like) or from a transport pipeline. In either case, the drilling fluid and/or the treatment fluids are drawn into the pump, elevated to an appropriate pressure, and then introduced into the transporting conduit for delivery downhole.

When desired for use, the individual components and additives of the drilling fluid, the acidic treatment fluid, and the enzymatic treatment fluid may be added to or combined with one another in any order and at any time during their use.

FIG. 1 is a schematic showing one example of a drilling assembly 100 suitable for drilling with a drilling fluid. Drilling assembly 100 is used to drill a wellbore 120 with a drilling fluid 145. Drilling fluid 145 may comprise drilling fluid additives that are water-soluble, acid-soluble, and/or enzyme-degradable. In some examples, the entirety of the drilling fluid additives are water-soluble, acid-soluble, and/or enzyme-degradable. In other examples, most of the drilling fluid additives are water-soluble, acid-soluble, and/or enzyme-degradable. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

The drilling assembly 100 includes a drilling platform 105 coupled to a drill string 110. The drill string 110 may include, but is not limited to, drill pipe and coiled tubing, as generally known to those skilled in the art apart from the particular teachings of this disclosure. A drill bit 115 is attached to the distal end of the drill string 110 and is driven either by a downhole motor and/or via rotation of the drill string 110 from the well surface. As the drill bit 115 rotates, it creates the wellbore 120 penetrating the subterranean formation 125. The drilling assembly 100 also includes a pump 130 (e.g., a mud pump) that circulates the drilling fluid 145 through a feed pipe 135 to the drill string 110, down the interior of the drill string 110, through one or more orifices in the drill bit 115, and into an annulus 140 between the drill string 110 and the walls of the wellbore 120.

The drilling fluid 145 is then circulated back to the surface via annulus 140. At the surface, the recirculated or spent drilling fluid 145 exits the annulus 140 and may be processed and cleaned before being passed to a retention pit. The cleaned drilling fluid 145 may then be reintroduced into the wellbore 120 via pump 130 if desired.

In some examples, drilling fluid additives may be added to the drilling fluid 145 via mixing equipment 150 communicably coupled to or otherwise in fluid communication with the retention pit. The mixing equipment 150 may include, but is not limited to, mixers and related mixing equipment known to those skilled in the art. In other examples, however, the drilling fluid additives may be added to the drilling fluid 145 at any other location in the drilling assembly 100. In at least one example, there could be more than one retention pit (e.g., there could be multiple retention pits in series). Moreover, the retention pit may be representative of one or more fluid storage facilities and/or units where the drilling fluid additives may be stored until added to the drilling fluid 145.

One skilled in the art would recognize the other equipment suitable for use in conjunction with drilling assembly 100, which may include, but is not limited to, mixers, shakers (e.g., shale shaker), centrifuges, hydrocyclones, separators (including magnetic and electrical separators), desilters, desanders, filters (e.g., diatomaceous earth filters), heat exchangers, and any fluid reclamation equipment. Further, the drilling assembly 100 may include one or more sensors, gauges, pumps, compressors, and the like.

It should be clearly understood that the drilling assembly 100 illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
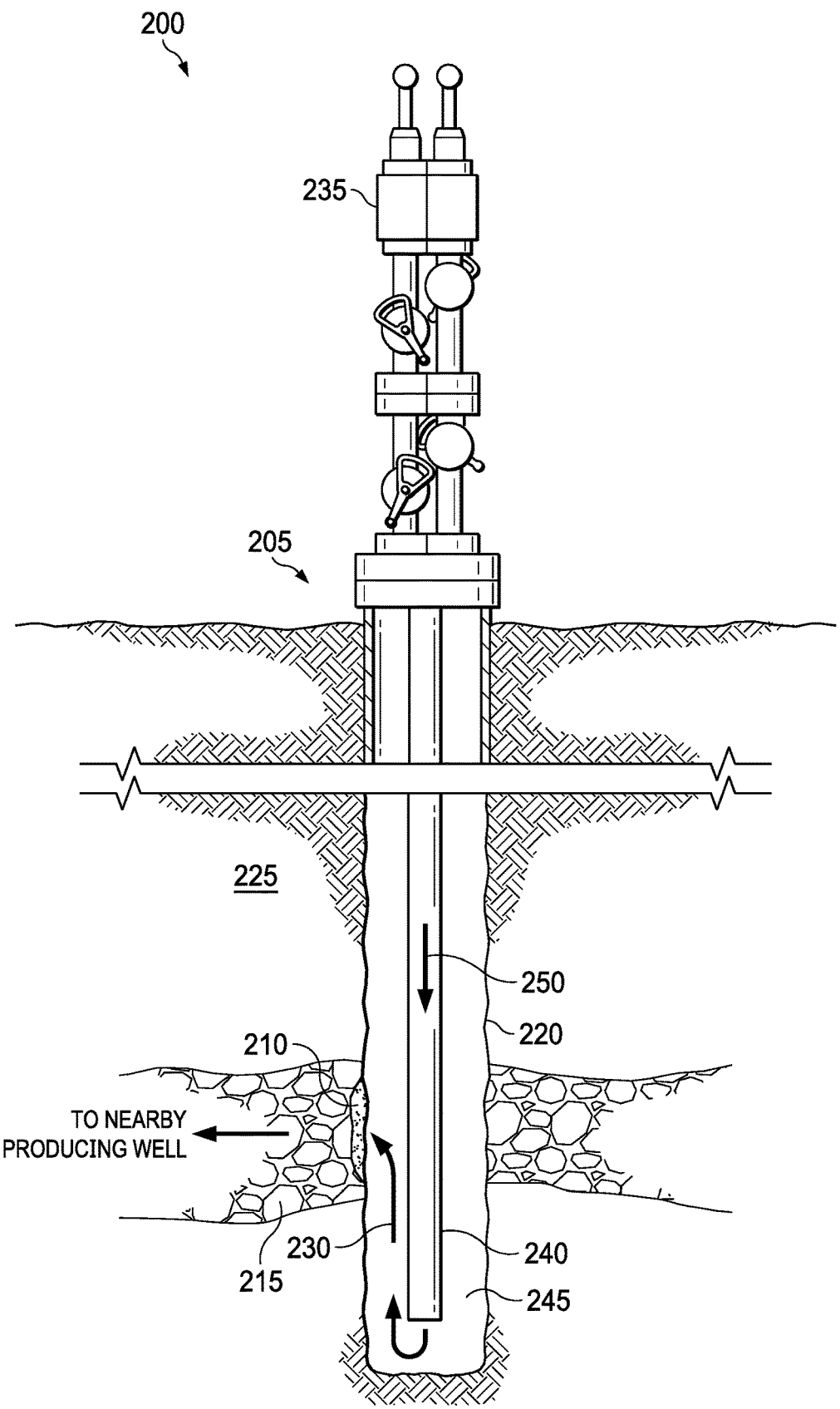
FIG. 2 is a schematic illustrating the treatment of an injection well in accordance with one or more examples described herein.

FIG. 2 is a schematic showing one example of an injection operation 200 being conducted in an injection well 205. For simplicity of illustration, some portions of the injection well 205 are illustrated as uncased; however, it is to be understood that the injection well 205 may have portions that are cased or uncased as desired. After drilling and completion, filter cake 210 may remain at the rock interface 215 of the subterranean formation 225 with the wellbore 220. The filer cake 210 may hinder flow through of injection fluids into the subterranean formation 225. To improve injectivity, the filter cake 210, as well as other formation damaging materials, may be removed. An acidic treatment fluid 230 may be introduced into the wellbore 220 via the Christmas tree 235, or any other sufficient injection point into the wellbore 220. In the illustrated example, the acidic treatment fluid 230 has been pumped down a tubing 240 to the bottom of the wellbore 220 and up through the annulus 245 where it may contact filter cake 210. The acidic treatment fluid 230 may be pumped to treat as long a wellbore 220 interval as desired. The acid within the acidic treatment fluid 230 may react with the acid-dissolvable components in the filter cake 210 and dissolve the acid-dissolvable components, thereby improving injectivity. As the acidic treatment fluid 230 treats the wellbore 220, it is not flowed back, but may enter into the subterranean formation 225. Although the acidic treatment fluid 230 is illustrated as being injected through the Christmas tree 235 and into tubing 240, it is to be understood that in alternative examples, the acidic treatment fluid 230 may be pumped directly down the annulus 245 to the treatment interval in a reverse circulation operation.

After treatment with the acidic treatment fluid 230, an enzymatic treatment fluid 250 may be injected into the wellbore 220 via the Christmas tree 235, or any other sufficient injection point into the wellbore 220. In the illustrated example, the enzymatic treatment fluid 250 is being pumped down a tubing 240 to the bottom of the wellbore 220, where it may exit and continue to be pumped up through the annulus 245 to contact filter cake 210 following the path of the acidic treatment fluid 230. The enzyme within the enzymatic treatment fluid 250 may react with any enzymatic-substrates (e.g., polysaccharides) in the filter cake 210 and degrade them into smaller components via hydrolysis or other chemical degradation mechanisms. The smaller components (e.g., simple sugars) may be dissolvable in the water phase of the enzymatic treatment fluid 250. As the enzymatic-substrates are removed, injectivity into the subterranean formation 225 may be improved. As the enzymatic treatment fluid 250 treats the wellbore 220, it is not flowed back, but may enter into the subterranean formation 225. Although the enzymatic treatment fluid 250 is illustrated as being injected through the Christmas tree 235 and into tubing 240, it is to be understood that in alternative examples, the enzymatic treatment fluid 250 may be pumped directly down the annulus 245 to the treatment interval in a reverse circulation operation.

After treatment with the acidic treatment fluid 230 and the enzymatic treatment fluid 250 is completed, a subsequently pumped injection fluid may be introduced into the subterranean formation 225 from the injection well 205, to drive hydrocarbons into a producing well also penetrating subterranean formation 225.

It should be clearly understood that the treatment of the injection well 205 illustrated by FIG. 2 is merely a general application of the principles of this disclosure in practice, and a wide variety of other examples are possible. Therefore, the scope of this disclosure is not limited in any manner to the details of FIG. 2 as described herein.

Figure 3:
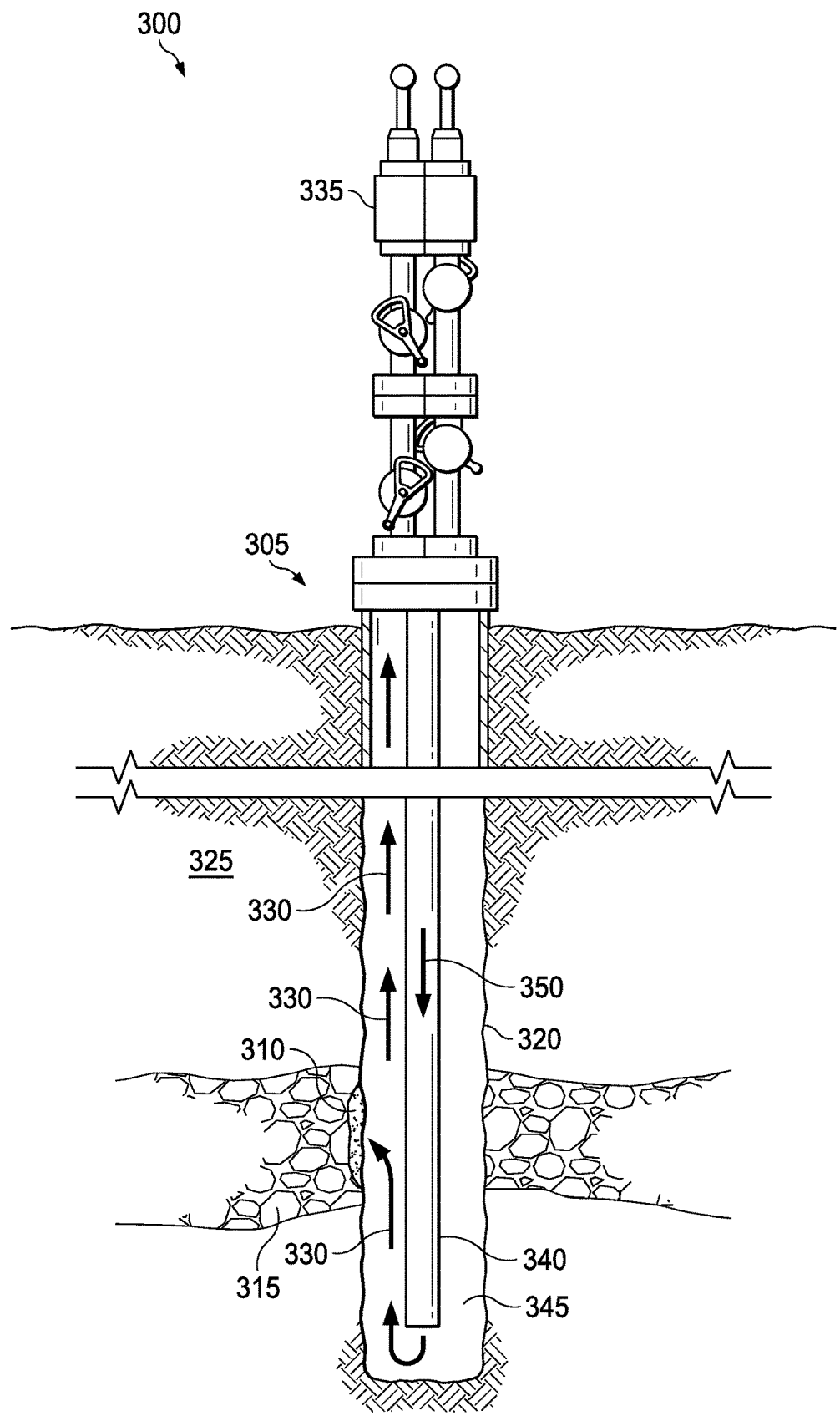
FIG. 3 is a schematic illustrating the treatment of a producing well in accordance with one or more examples described herein.

FIG. 3 is a schematic showing one example of an enhanced recovery operation 300 being conducted in a producing well 305. For simplicity of illustration, portions of the producing well 305 are illustrated as uncased; however, it is to be understood that the producing well 305 may have portions that are cased or uncased as desired. After drilling and completion, filter cake 310 may remain at the rock interface 315 of the subterranean formation 325 and the wellbore 320. The filter cake 310 may hinder the flow of hydrocarbons out of the subterranean formation 325 and into the wellbore 320 where they may be pumped to the surface and produced. To improve production, the filter cake 310, as well as other formation damaging materials, may be removed. An acidic treatment fluid 330 may be injected into the wellbore 320 via the Christmas tree 335, or any other sufficient injection point into the wellbore 320. In the illustrated example, the acidic treatment fluid 330 has been pumped down a tubing 340 to the bottom of the wellbore 320 and up through an annulus 345 where it may contact the filter cake 310. The acidic treatment fluid 330 may be pumped to treat as long a wellbore 320 interval as desired. The acid within the acidic treatment fluid 330 may react with the acid-dissolvable components in the filter cake 310 and dissolve the acid-dissolvable components, thereby improving production. The acidic treatment fluid 330 is flowed back to the surface after treatment. Although the acidic treatment fluid 330 is illustrated as being injected through the Christmas tree 335 and into tubing 340, it is to be understood that in alternative examples, the acidic treatment fluid 330 may be pumped directly down the annulus 345 to the treatment interval in a reverse circulation operation.

After treatment with the acidic treatment fluid 330, an enzymatic treatment fluid 350 may be introduced into the wellbore 320 via the Christmas tree 335, or any other sufficient injection point into the wellbore 320. In the illustrated example, the enzymatic treatment fluid 350 is being pumped down a tubing 340 to the bottom of the wellbore 320 where it may exit and continue to be pumped up through the annulus 345 to contact filter cake 310 following the path of the acidic treatment fluid 330. The enzyme within the enzymatic treatment fluid 350 may react with any enzymatic-substrates (e.g., polysaccharides) in the filter cake 310 and degrade them into smaller components via hydrolysis or other chemical degradation mechanisms. The smaller components (e.g., simple sugars) may be dissolvable in the water phase of the enzymatic treatment fluid 350. As the enzymatic-substrates are removed, production may be improved. The enzymatic treatment fluid 350 is flowed back towards the surface after treatment. Although the enzymatic treatment fluid 350 is illustrated as being injected through the Christmas tree 335 and into tubing 340, it is to be understood that in alternative examples, the enzymatic treatment fluid 350 may be pumped directly down the annulus 345 to the treatment interval in a reverse circulation operation.

After treatment with the acidic treatment fluid 330 and the enzymatic treatment fluid 350 is completed, the producing well 305 may be placed back on production if desired.

It should be clearly understood that the treatment of the producing well 305 illustrated by FIG. 3 is merely a general application of the principles of this disclosure in practice, and a wide variety of other examples are possible. Therefore, the scope of this disclosure is not limited in any manner to the details of FIG. 3 as described herein.

It is also to be recognized that the disclosed treatment methods may also directly or indirectly affect the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-3.

Provided are methods of treating a well in accordance with the disclosure and the illustrated FIGs. An example method comprises introducing an acidic treatment fluid into the well; wherein the acidic treatment fluid comprises an acid and a first aqueous base fluid. The method further comprises introducing an enzymatic treatment fluid into the well; wherein the enzymatic treatment fluid comprises an enzyme and a second aqueous base fluid. The method additionally comprises contacting the filter cake with the acidic treatment fluid and contacting the filter cake with the enzymatic treatment fluid after the filter cake was contacted with the acidic treatment fluid.

Additionally or alternatively, the method may include one or more of the following features individually or in combination. The method may further comprise drilling the well with a drilling fluid; wherein the drilling fluid comprises a plurality of drilling fluid additives; wherein at least one of the drilling fluid additives in the plurality is water-soluble; wherein at least one of the drilling fluid additives in the plurality is acid-soluble; wherein at least one of the drilling fluid additives in the plurality is enzyme-degradable. The well may penetrate a surface of the Earth; wherein the method further comprises flowing the acidic treatment fluid and the enzymatic treatment fluid towards the surface. The well may penetrate a surface of the Earth; wherein the method does not further comprise flowing the acidic treatment fluid and the enzymatic treatment fluid towards the surface. The acid may comprise an acid selected from the group consisting of hydrochloric acid, hydrofluoric acid, sulfuric acid, phosphoric acid, formic acid, acetic acid, citric acid, adipic acid, succinic acid, glutaric acid, lactic acid, sulfamic acid, ethylene diamine tetra acetic acid, and any combination thereof. The acid may be generated from an acid generator selected from the group consisting of ethyl lactate, methyl lactate, glucono-delta-lactone, polylactic acid, polyglycolic acid, poly(3-hydroxybutyrate), polysuccinate ester, polyanhydride, maleic anhydride, orthoester, formate ester-diethylene glycol diformate, acetate ester, L-dilactide, lactate ester butyl lactate, poly(lactic-co-glycolic acid), poly(glycolic-co-caprolactone), polycaprolactone, poly(glycolic-co-trimethylene carbonate), poly(lactic-co-caprolactone), poly(lactic-co-trimethylene carbonate), polyglyconate, polyglactin, poly(lactic-co-glycolic acid)-methoxy-poly(ethyleneglycol) copolymer, polydioxanone, derivatives thereof, and any combination thereof. The filter cake may comprise xanthan gum, welan gum, gellan gum, guar gum, succinoglycon gum, diutan gum, cornstarch, arrowroot, potato starch, scleroglucan, cellulose, hydroxyethyl cellulose, derivatives thereof, or any combination thereof. The enzyme may comprise an enzyme selected from the group consisting of an $\alpha$-amylase, a $\beta$-amylase, a $\gamma$-amylases, cellulase, xanthanase, and any combination thereof. The well may be an injection well or a producing well. A spacer fluid may be introduced into the well after the introduction of the acidic treatment fluid and before the introduction of the enzymatic treatment fluid.

Provided are methods of treating a well in accordance with the disclosure and the illustrated FIGs. An example method comprises drilling the well with a drilling fluid; wherein the drilling fluid comprises a plurality of drilling fluid additives; wherein at least one of the drilling fluid additives in the plurality is water-soluble; wherein at least one of the drilling fluid additives in the plurality is acid-soluble; wherein at least one of the drilling fluid additives in the plurality is enzyme-degradable. The method further comprises introducing an acidic treatment fluid into the well; wherein the acidic treatment fluid comprises the acid and a first aqueous base fluid. The method additionally comprises introducing an enzymatic treatment fluid into the well; wherein the enzymatic treatment fluid comprises the enzyme and a second aqueous base fluid. The method further comprises contacting the filter cake with the acidic treatment fluid and contacting the filter cake with the enzymatic treatment fluid after the filter cake was contacted with the acidic treatment fluid; wherein the filter cake comprises the drilling fluid additive that is acid-soluble and the drilling fluid additive that is enzyme-degradable.

Additionally or alternatively, the method may include one or more of the following features individually or in combination. The well may penetrate a surface of the Earth; wherein the method further comprises flowing the acidic treatment fluid and the enzymatic treatment fluid towards the surface. The well may penetrate a surface of the Earth; wherein the method does not further comprise flowing the acidic treatment fluid and the enzymatic treatment fluid towards the surface. The acid may comprise an acid selected from the group consisting of hydrochloric acid, hydrofluoric acid, sulfuric acid, phosphoric acid, formic acid, acetic acid, citric acid, adipic acid, succinic acid, glutaric acid, lactic acid, sulfamic acid, ethylene diamine tetra acetic acid, and any combination thereof. The acid may be generated from an acid generator selected from the group consisting of ethyl lactate, methyl lactate, glucono-delta-lactone, polylactic acid, polyglycolic acid, poly(3-hydroxybutyrate), polysuccinate ester, polyanhydride, maleic anhydride, orthoester, formate ester-diethylene glycol diformate, acetate ester, L-dilactide, lactate ester butyl lactate, poly(lactic-co-glycolic acid), poly(glycolic-co-caprolactone), polycaprolactone, poly(glycolic-co-trimethylene carbonate), poly(lactic-co-caprolactone), poly(lactic-co-trimethylene carbonate), polyglyconate, polyglactin, poly(lactic-co-glycolic acid)-methoxy-poly(ethyleneglycol) copolymer, polydioxanone, derivatives thereof, and any combination thereof. The filter cake may comprise xanthan gum, welan gum, gellan gum, guar gum, succinoglycon gum, diutan gum, cornstarch, arrowroot, potato starch, scleroglucan, cellulose, hydroxyethyl cellulose, derivatives thereof, or any combination thereof. The enzyme may comprise an enzyme selected from the group consisting of an α-amylase, a β-amylase, a γ-amylases, cellulase, xanthanase, and any combination thereof. The well may be an injection well or a producing well. A spacer fluid may be introduced into the well after the introduction of the acidic treatment fluid and before the introduction of the enzymatic treatment fluid.

Provided are systems for treating a well in accordance with the disclosure and the illustrated FIGs. An example system comprises a drilling fluid comprising a plurality of drilling fluid additives; wherein at least one of the drilling fluid additives in the plurality is water-soluble; wherein at least one of the drilling fluid additives in the plurality is acid-soluble; wherein at least one of the drilling fluid additives in the plurality is enzyme-degradable. The system further comprises an acidic treatment fluid comprising an acid and a first aqueous base fluid. The system additionally comprises an enzymatic treatment fluid comprising the enzyme and a second aqueous base fluid. The system also comprises a tubing extending into the well penetrating a subterranean formation; wherein the tubing is configured to circulate the drilling fluid, the acidic treatment fluid, or the enzymatic treatment fluid in the well and a pump fluidly coupled to the tubing. Additionally or alternatively, the system may include one or more of the following features individually or in combination. The system may be configured such that the acidic treatment fluid is circulated in the tubing prior to the enzymatic treatment fluid. The well may penetrate a surface of the Earth; wherein the method further comprises flowing the acidic treatment fluid and the enzymatic treatment fluid towards the surface. The well may penetrate a surface of the Earth; wherein the method does not further comprise flowing the acidic treatment fluid and the enzymatic treatment fluid towards the surface. The acid may comprise an acid selected from the group consisting of hydrochloric acid, hydrofluoric acid, sulfuric acid, phosphoric acid, formic acid, acetic acid, citric acid, adipic acid, succinic acid, glutaric acid, lactic acid, sulfamic acid, ethylene diamine tetra acetic acid, and any combination thereof. The acid may be generated from an acid generator selected from the group consisting of ethyl lactate, methyl lactate, glucono-delta-lactone, polylactic acid, polyglycolic acid, poly(3-hydroxybutyrate), polysuccinate ester, polyanhydride, maleic anhydride, orthoester, formate ester-diethylene glycol diformate, acetate ester, L-dilactide, lactate ester butyl lactate, poly(lactic-co-glycolic acid), poly(glycolic-co-caprolactone), polycaprolactone, poly(glycolic-co-trimethylene carbonate), poly(lactic-co-caprolactone), poly(lactic-co-trimethylene carbonate), polyglyconate, polyglactin, poly(lactic-co-glycolic acid)-methoxy-poly(ethyleneglycol) copolymer, polydioxanone, derivatives thereof, and any combination thereof. The filter cake may comprise xanthan gum, welan gum, gellan gum, guar gum, succinoglycon gum, diutan gum, cornstarch, arrowroot, potato starch, scleroglucan, cellulose, hydroxyethyl cellulose, derivatives thereof, or any combination thereof. The enzyme may comprise an enzyme selected from the group consisting of an α-amylase, a β-amylase, a γ-amylases, cellulase, xanthanase, and any combination thereof. The well may be an injection well or a producing well. A spacer fluid may be introduced into the well after the introduction of the acidic treatment fluid and before the introduction of the enzymatic treatment fluid.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating a well comprising a filter cake, the method comprising:
   introducing an acidic treatment fluid into the well;
     wherein the acidic treatment fluid comprises an acid and a first aqueous base fluid;
   contacting the filter cake with the acidic treatment fluid;
   introducing an enzymatic treatment fluid into the well;
     wherein the enzymatic treatment fluid comprises an enzyme and a second aqueous base fluid; and contacting the filter cake with the enzymatic treatment fluid after the filter cake was contacted with the acidic treatment fluid; wherein a spacer fluid is introduced into the well after the introduction of the acidic treatment fluid and before the introduction of the enzymatic treatment fluid.

2. The method of claim 1, further comprising drilling the well with a drilling fluid; wherein the drilling fluid comprises a plurality of drilling fluid additives; wherein at least one of the drilling fluid additives in the plurality is water-soluble; wherein at least one of the drilling fluid additives in the plurality is acid-soluble; wherein at least one of the drilling fluid additives in the plurality is enzyme-degradable.

3. The method of claim 1, wherein the well penetrates a surface of the Earth; wherein the method further comprises flowing the acidic treatment fluid and the enzymatic treatment fluid towards the surface.

4. The method of claim 1, wherein the well penetrates a surface of the Earth; wherein the method does not further comprise flowing the acidic treatment fluid and the enzymatic treatment fluid towards the surface.

5. The method of claim 1, wherein the acid comprises an acid selected from the group consisting of hydrochloric acid, hydrofluoric acid, sulfuric acid, phosphoric acid, formic acid, acetic acid, citric acid, adipic acid, succinic acid, glutaric acid, lactic acid, sulfamic acid, ethylene diamine tetra acetic acid, and any combination thereof.

6. The method of claim 1, wherein the acid is generated from an acid generator selected from the group consisting of ethyl lactate, methyl lactate, glucono-delta-lactone, polylactic acid, polyglycolic acid, poly(3-hydroxybutyrate), polysuccinate ester, polyanhydride, maleic anhydride, orthoester, formate ester-diethylene glycol diformate, acetate ester, L-dilactide, lactate ester butyl lactate, poly(lactic-co-glycolic acid), poly(glycolic-co-caprolactone), polycaprolactone, poly(glycolic-co-trimethylene carbonate), poly(lactic-co-caprolactone), poly(lactic-co-trimethylene carbonate), polyglyconate, polyglactin, poly(lactic-co-glycolic acid)-methoxy-poly(ethyleneglycol) copolymer, polydioxanone, derivatives thereof, and any combination thereof.

7. The method of claim 1, wherein the filter cake comprises xanthan gum, welan gum, gellan gum, guar gum, succinoglycan gum, diutan gum, cornstarch, arrowroot, potato starch, scleroglucan, cellulose, hydroxyethyl cellulose, derivatives thereof, or any combination thereof.

8. The method of claim 1, wherein the enzyme comprises an enzyme selected from the group consisting of an α-amylase, a β-amylase, a γ-amylases, cellulase, xanthanase, and any combination thereof.

9. The method of claim 1, wherein the well is an injection well or a producing well.

10. A method for treating a well comprising a filter cake, the method comprising:
  drilling the well with a drilling fluid; wherein the drilling fluid comprises a plurality of drilling fluid additives; wherein at least one of the drilling fluid additives in the plurality is water-soluble; wherein at least one of the drilling fluid additives in the plurality is acid-soluble; wherein at least one of the drilling fluid additives in the plurality is enzyme-degradable;
  introducing an acidic treatment fluid into the well; wherein the acidic treatment fluid comprises an acid and a first aqueous base fluid;
  contacting the filter cake with the acidic fluid;
  introducing an enzymatic treatment fluid into the well; wherein the enzymatic treatment fluid comprises an enzyme and a second aqueous base fluid; and
  contacting the filter cake with the enzymatic treatment fluid after the filter cake was contacted with the acidic treatment fluid; wherein a spacer fluid is introduced into the well after the introduction of the acidic treatment fluid and before the introduction of the enzymatic treatment fluid; wherein the filter cake comprises the drilling fluid additive that is acid-soluble and the drilling fluid additive that is enzyme-degradable.

11. The method of claim 10, wherein the well penetrates a surface of the Earth; wherein the method further comprises flowing the acidic treatment fluid and the enzymatic treatment fluid towards the surface.

12. The method of claim 10, wherein the well penetrates a surface of the Earth; wherein the method does not further comprise flowing the acidic treatment fluid and the enzymatic treatment fluid towards the surface.

13. The method of claim 10, wherein the acid comprises an acid selected from the group consisting of hydrochloric acid, hydrofluoric acid, sulfuric acid, phosphoric acid, formic acid, acetic acid, citric acid, adipic acid, succinic acid, glutaric acid, lactic acid, sulfamic acid, ethylene diamine tetra acetic acid, and any combination thereof.

14. The method of claim 10, wherein the acid is generated from an acid generator selected from the group consisting of ethyl lactate, methyl lactate, glucono-delta-lactone, polylactic acid, polyglycolic acid, poly(3-hydroxybutyrate), polysuccinate ester, polyanhydride, maleic anhydride, orthoester, formate ester-diethylene glycol diformate, acetate ester, L-dilactide, lactate ester butyl lactate, poly(lactic-co-glycolic acid), poly(glycolic-co-caprolactone), polycaprolactone, poly(glycolic-co-trimethylene carbonate), poly(lactic-co-caprolactone), poly(lactic-co-trimethylene carbonate), polyglyconate, polyglactin, poly(lactic-co-glycolic acid)-methoxy-poly(ethyleneglycol) copolymer, polydioxanone, derivatives thereof, and any combination thereof.

15. The method of claim 10, wherein the filter cake comprises xanthan gum, welan gum, gellan gum, guar gum, succinoglycan gum, diutan gum, cornstarch, arrowroot, potato starch, scleroglucan, cellulose, hydroxyethyl cellulose, derivatives thereof, or any combination thereof.

16. The method of claim 10, wherein the enzyme comprises an enzyme selected from the group consisting of an α-amylase, a β-amylase, a γ-amylases, cellulase, xanthanase, and any combination thereof.

17. A system for treating a well comprising a filter cake, the system comprising:
  a drilling fluid comprising a plurality of drilling fluid additives; wherein at least one of the drilling fluid additives in the plurality is water-soluble; wherein at least one of the drilling fluid additives in the plurality is acid-soluble; wherein at least one of the drilling fluid additives in the plurality is enzyme-degradable;
  an acidic treatment fluid comprising an acid and a first aqueous base fluid;
  an enzymatic treatment fluid comprising the enzyme and a second aqueous base fluid;
  a spacer fluid; wherein the system is configured such that the acidic treatment fluid is circulated in a tubing prior to the enzymatic treatment fluid; where the system is configured such that the spacer fluid is circulated in the tubing after the circulation of the acidic treatment fluid and before the circulation of the enzymatic treatment fluid;
  the tubing extending into the well penetrating a subterranean formation; wherein the tubing is configured to circulate the drilling fluid, the acidic treatment fluid, the spacer fluid, or the enzymatic treatment fluid in the well; and a pump fluidly coupled to the tubing.

18. The system of claim 17, wherein the enzyme comprises an enzyme selected from the group consisting of an α-amylase, a β-amylase, a γ-amylases, cellulase, xanthanase, and any combination thereof.

19. The system of claim 17, wherein the acid comprises an acid selected from the group consisting of hydrochloric acid, hydrofluoric acid, sulfuric acid, phosphoric acid, formic acid, acetic acid, citric acid, adipic acid, succinic acid, glutaric acid, lactic acid, sulfamic acid, ethylene diamine tetra acetic acid, and any combination thereof.

20. The system of claim 17, wherein the acid is generated from an acid generator selected from the group consisting of ethyl lactate, methyl lactate, glucono-delta-lactone, polylactic acid, polyglycolic acid, poly(3-hydroxybutyrate), polysuccinate ester, polyanhydride, maleic anhydride, orthoester, formate ester-diethylene glycol diformate, acetate ester, L-dilactide, lactate ester butyl lactate, poly(lactic-co-glycolic acid), poly(glycolic-co-caprolactone), polycaprolactone, poly(glycolic-co-trimethylene carbonate), poly(lactic-co-caprolactone), poly(lactic-co-trimethylene carbonate), polyglyconate, polyglactin, poly(lactic-co-glycolic acid)-methoxy-poly(ethyleneglycol) copolymer, polydioxanone, derivatives thereof, and any combination thereof.

* * * * *